Patented Feb. 20, 1951

2,542,965

UNITED STATES PATENT OFFICE 2,542,965

PREPARATION OF DIHYDROCOUMARINS

Charles L. Levesque, Philadelphia, Pa., assignor to Rohm & Haas Company, Philadelphia, Pa., a corporation of Delaware No Drawing. Application February 25, 1949, Serial No. 78,474

3 Claims. (Cl. 260—344.6)

This invention relates to a process of preparing dihydrocoumarins having the general formula

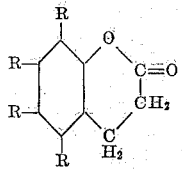

in which the characters R represent hydrogen atoms or monovalent hydrocarbon radicals.

The process comprises first reacting an o-allylphenol of the general formula

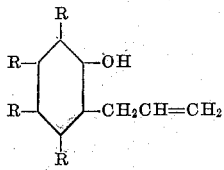

in which the characters R have the same significance as in the previous formula with aqueous ammonia and sulfur, then heating the reaction product with aqueous alkali, acidifying the resultant product, extracting the acidified aqueous mixture with an organic solvent, heating the extracted material to remove said organic solvent, heating the residue to a temperature from 100° C. to 250° C., and thereafter separating said dihydrocoumarin.

The simplest phenol which is employed in this process is o-allylphenol itself. Substituted allylphenols are also operable in which any or all of the four positions, shown to be occupied by the characters R in the first general formula above, are substituted by monovalent hydrocarbon groups. These hydrocarbon substituents can be aliphatic or aromatic. The aliphatic groups are free of aliphatic or non-benzenoid unsaturation and, as such, do not contain double or triple bonds. Such aliphatic groups are exemplified by alkyl groups such as methyl, ethyl, n-propyl, isobutyl, tert.-amyl, octyl, dodecyl, octadecyl groups and their iosmers. The length of the aliphatic chain in the substituents R and the arrangement of the carbon atoms therein are not important factors since these substituting groups remain inert and unreactive during the process of this invention. Allylphenols containing cycloaliphatic substituents, such as cyclohexyl groups, can be employed as well as allylphenols in which the substituents are aromatic groups such as phenyl, naphthyl, ethylphenyl, dimethylphenyl, and the like or araliphatic groups such as the benzyl group.

Although the allylphenol, ammonia, and sulfur react, during the first step of this process, in the molar ratio of 1:1:2, it is desirable to employ an excess of sulfur and/or ammonia. As much as 10 moles of ammonia and 5 of sulfur are often employed per mole of allylphenol. Larger amounts can be used but have no advantage and, especially in the case of sulfur, make purification of the product more difficult. Alternatively, ammonium polysulfide can be used to advantage. The reaction is conducted under superatmospheric pressure and pressures up to about 40 atmospheres are suitable. The pressure, of necessity, will vary with the temperature. Temperatures from 100° C. to 300° C. can be employed and those from 140° C. to 180° C. are recommended.

After the reaction is complete, in a matter of a few hours, as usually evidenced by a fall in pressure, the reaction product is hydrolyzed. Prior to hydrolysis the reaction mixture can be concentrated or evaporated to dryness. A convenient method is to heat the product, preferably at refluxing temperature, together with an alkaline aqueous solution as, for example, with a dilute solution of sodium hydroxide or potassium hydroxide. Since this step in the process is one of hydrolysis, it is only necessary that the conditions be conducive to hydrolysis. Such conditions are well-established. An alkaline solution is best for the purpose but the particular composition and concentration of the solution is not critical so long as it is aqueous and alkaline. Solutions of any alkaline material such as lithium hydroxide, sodium carbonate, or quaternary ammonium hydroxides are satisfactory. The important point is that the reaction product of the allylphenol, sulfur, and ammonia be positively hydrolyzed; and the established techniques, equipment, reagents, and procedures customarily used for hydrolyzing compounds can be employed.

The hydrolyzed product in solution is then acidified, for example with sulfuric acid or hydrochloric acid. Since this step is one of acidifying, any acid, within reason, can be used; but preference is naturally given to the strongest and the cheapest.

The acidified organic product is then dissolved in a water-immiscible, inert, organic solvent. This can be done by extracting the aqueous solution with a solvent such as ether, benzene, or ethylene dichloride. Preferably, the aqueous solution is concentrated prior to extraction. This step separates the organic product from the inorganic materials such as salts and sulfur.

The organic solution of extracted material is then freed of the organic solvent by evaporation or distillation and the residue is heated to a temperature above 100° C., and preferably from 150° C. to 250° C. During this step, ring closure occurs with the elimination of water. In many instances the temperature at which the solvent is removed is adequate to cause ring closure. The product, a dihydrocoumarin, is then readily purified, for example, by distillation in vacuo.

These dihydrocoumarins are valuable as intermediate chemicals in the preparation of other materials such as surface-active agents, fungicides, and bactericides. They may readily be converted into beta-(hydroxyphenyl) propionic acids.

The process of this invention is subject to reasonable variations, as for example in the choice of extracting, organic liquid, without departing from the spirit of this invention since the purpose of the invention is to prepare dihydrocoumarin and substituted dihydrocoumarins from sulfur, ammonia, and allylphenols, all of which are readily available.

The following examples serve to illustrate the process in greater detail.

*Example 1*

A mixture of 112 grams of o-allylphenol, 150 grams of sulfur, 200 cc. of concentrated ammonium hydroxide and 150 cc. of isopropyl alcohol was sealed in an autoclave and was stirred and heated at 150°–160° C. for four hours. The pressure reached a maximum of 270 lbs./sq. in. during the heating period. The autoclave was cooled and vented and the contents evaporated to dryness. The residue was leached with several portions totalling 2000 cc. of water and the resultant aqueous solution was boiled with decolorizing charcoal and filtered. To this filtrate was added 70 grams of solid sodium hydroxide and this solution was then distilled until 600 cc. of distillate was collected. The residual solution was acidified with 259 cc. of 25% sulfuric acid solution and was then extracted with three 250 cc.-portions of ether. The extracts were combined and the ether was distilled off. The residue was then fractionally distilled at a pressure of about 1 mm. The product, an oil, was identified as dihydrocoumarin (B. P. 102°–104° C. at 0.8 mm.; $N_D^{25}$ 1.5528; saponification number is 377 as against a calculated value of 378.5 for $C_9H_8O_2$).

*Example 2*

A mixture of 129 grams of 2-methyl-4-tert.-octyl-6-allylphenol, 85 grams of sulfur, 135 cc. of concentrated ammonium hydroxide, and 225 cc. of isopropyl alcohol was sealed in an autoclave and stirred and heated at 145°–148° C. for four hours. The maximum pressure was 200 lbs./sq. in. The autoclave was cooled and vented; and the product was evaporated to dryness and taken up in methanol. Two hundred cubic centimeters of a 25% aqueous solution of sodium hydroxide was added to the methanol solution which was thereafter heated, acidified, extracted with solvent, then freed of solvent, and finally fractionally distilled in the exact way described in Example 1. The product, a viscous liquid, was identified as 8-methyl-6-tert.-octyl-dihydrocoumarin.

I claim:

1. A process for the preparation of dihydrocoumarins having the general formula

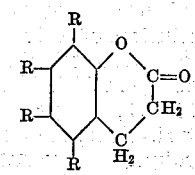

in which the characters R represent a member from the class consisting of hydrogen atoms and monovalent hydrocarbon radicals which are free of aliphatic unsaturation, which comprises reacting, at a temperature of 100° C. to 300° C. and under superatmospheric pressure, sulfur, aqueous ammonia, and an allylphenol having the general formula

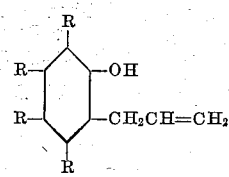

in which the characters R have the same significance as described above, hydrolyzing the product by heating it with an aqueous alkaline solution, then acidifying said solution, extracting the acidified product with a water-immiscible, organic solvent, removing said solvent from the extract, heating the residue to a temperature of 100° C. to 250° C. and removing the dihydrocoumarin from said residue.

2. A process for the preparation of dihydrocoumarin of the formula

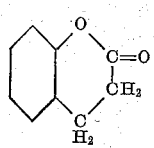

which comprises reacting at a temperature of 140° C. to 180° C. and under superatmospheric pressure, sulfur, aqueous ammonia, and o-allylphenol, hydrolyzing the product by heating it with an aqueous alkaline solution, then acidifying said solution, extracting the acidified organic product with a water-immiscible, organic solvent, removing said solvent from the extract, heating the residue to a temperature of 100° C. to 250° C., and removing dihydrocoumarin from said residue.

3. A process for the preparation of 8-methyl-6-tert.-octyl dihydrocoumarin of the formula

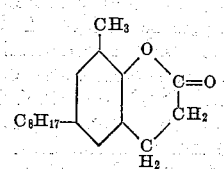

which comprises reacting, at a temperature of 140° C. to 180° C. and under superatmospheric pressure, sulfur, aqueous ammonia, and 2-methyl-4-tert.-octyl-6-allylphenol, heating the product with an aqueous alkaline solution, then acidifying said solution, extracting the acidified product with a water-immiscible organic solvent, removing said solvent from the extract, heating the residue to a temperature of 100° C. to 250° C. and removing 8-methyl-6-tert.-octyl dihydrocoumarin from said residue.

CHARLES L. LEVESQUE.

No references cited.